United States Patent
Lloyd et al.

(10) Patent No.: US 8,280,912 B2
(45) Date of Patent: Oct. 2, 2012

(54) POWER MONITORING DEVICE SIMULATION USING A DATABASE PROFILE GENERATED FROM REAL TIME-VALUE DATA

(75) Inventors: Chad Andrew Lloyd, Old Hickory, TN (US); Tony Johnson, Murfreesboro, TN (US); Jayme McQuillan, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 105 days.

(21) Appl. No.: 12/895,124

(22) Filed: Sep. 30, 2010

(65) Prior Publication Data

US 2012/0084324 A1    Apr. 5, 2012

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

2005/0246390 A1*  11/2005  House et al. ................. 707/200

OTHER PUBLICATIONS

International Search Report, PCT/US2011/053659, dated Dec. 15, 2011, 3 pages.
Publication: Par Carling and Per Isakson: "Ett verktyg for funktionsanalys och vvs-anlaggningar, del 2," KTH and AF-Installation; Mar. 21, 2004, XP002664977, Retrieved from Internet: http://web.byv.kth.se/avd/itek/proj/pi [retrieved on Dec. 2, 2011] Sections 3.2 and 3.8; pp. 10, 14, 24; figure 1.

* cited by examiner

*Primary Examiner* — Isaac M Woo
(74) *Attorney, Agent, or Firm* — Nixon Peabody LLP

(57) ABSTRACT

A system and methods for using data from an external database compiled from real device used for testing and simulation of a system. The system includes an external database interface to access an external database. The external database includes a plurality of categories of time-value data collected from an electrical device. An importer converts one of plurality of categories of time-value data to a corresponding topic of a common data format. A device profiler is coupled to the importer to create a device profile including the converted topic. A database profiler creates a database profile representing a system including a device defined by the device profile and including the category of time-value data.

20 Claims, 6 Drawing Sheets

POWER MONITORING DEVICE SIMULATION USING A DATABASE PROFILE GENERATED FROM REAL TIME-VALUE DATA

TECHNICAL FIELD

Aspects disclosed herein relate generally to profiling a system and more specifically using existing data to generate a simulated system database profile.

BACKGROUND

Microprocessor-based electrical power distribution equipment such as switchgear, switchboards, panelboards, and motor control centers accumulate considerable amounts of information concerning the electrical distribution systems to which they are connected, as well as the power equipment itself. A common requirement for such equipment is the performance of regular maintenance and the generation and maintenance of up-to-date records of all testing and improvements performed. This is currently done via manual means or by entering data into a computer-based "maintenance log."

Today's utility monitoring systems provide end-users with the capability to remotely monitor a variety of equipment via automatic monitoring devices. This allows more accurate data and decreases human resource requirements. Industrial automation, monitoring, energy management, and control systems include many microprocessor or microcontroller-based monitoring devices which communicate with each other, as well as with other computers, via the MODBUS® (hereafter "Modbus") communication protocol.

The Modbus communication protocol is used with various slave devices that respond to read and write requests from a master controller. Among the features provided by this communication protocol are a means for the user to access data from and/or configure these intelligent slave devices. The Modbus physical layer may be an RS-232 or RS-485 serial connection from the slave device to the master controller or a connection over Ethernet, wrapped in a TCP/IP format, which provides the ability to access these devices from potentially anywhere via a network. The network configuration for use of the Modbus protocol wrapped in a TCP/IP format includes a gateway device that has a serial interface to receive data from the slave devices and an Ethernet interface to share the data with networked devices. The use of Modbus or similar protocols allows a large amount of data to be obtained from a monitored system. The analysis and control of such systems occurs with specialized monitoring software that manages the time-value data from the monitoring devices for various functions. Such software manages a large amount of data from complex systems and thus requires testing in order to ensure its proper operation.

Testing power monitoring software frequently requires access to test databases of large amounts of stored electrical data which represents the operating conditions where such data would be obtained from the monitoring devices in a system. Traditionally, the data for these test databases is generated using custom tools designed specifically for this purpose. These tools will bulk insert records of representative data into the database to represent logged electrical data simulating actual monitoring device outputs. The represented electrical data in the test databases is randomly generated. This process requires a large amount of data due to the complexity of the custom tools which sometimes require hours to generate a database in some cases. Further, the represented logged electrical data in the test database does not generate predictable data since it may be somewhat realistic but does not take into account real world events such as such as corrupted values or device communications losses. Such tools also generate a new dataset each time a test is run due to the pseudo-randomness of the algorithm underlying the custom tools. This creates a challenge when it is desired to have identical data in multiple data stores of different types for different simulation conditions. Finally, existing tools do not address the need for data that accurately reflects data obtained from real-time devices in real environments for simulation purposes.

Therefore there is a need for a power system simulation and database profiling that provides an improved way to generate test database profiles to test power-related software systems. An improved system is necessary for use of such test database profiles during the deployment/commissioning and support phases of a product.

BRIEF SUMMARY

According to one example, a system to generate a test database is disclosed. The system includes an external database interface to access an external database. The external database includes a plurality of categories of time-value data collected from an electrical device. An converts one of a plurality of categories of time-value data to a corresponding topic of a common data format. A device profiler is coupled to the importer to create a device profile including the converted topic. A database profiler creates a database profile representing a system including a device defined by the device profile and including the category of time-value data.

Another example is a method for generating a test database. An external database including a plurality of categories of time-value data collected from an electrical device is accessed via an interface. One of plurality of categories of time-value data is converted to a corresponding topic of a common data format. A device profile including the converted topic is created. A database profile representing a system including a device defined by the device profile and including the category of time-value data is created.

Another example is a machine readable medium having stored thereon instructions for generating a test database from an external database of time-value entries collected from an electrical device. The stored instructions include machine executable code, which when executed by at least one machine processor, causes the machine to access an external database including a plurality of categories of time-value data collected from an electrical device via an interface. The instructions further cause the machine to convert one of plurality of categories of time-value data to a corresponding topic of a common data format. The instructions cause the machine to create a device profile including the converted topic. The instructions cause the machine to create a database profile representing a system including a device defined by the device profile and including the category of time-value data.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
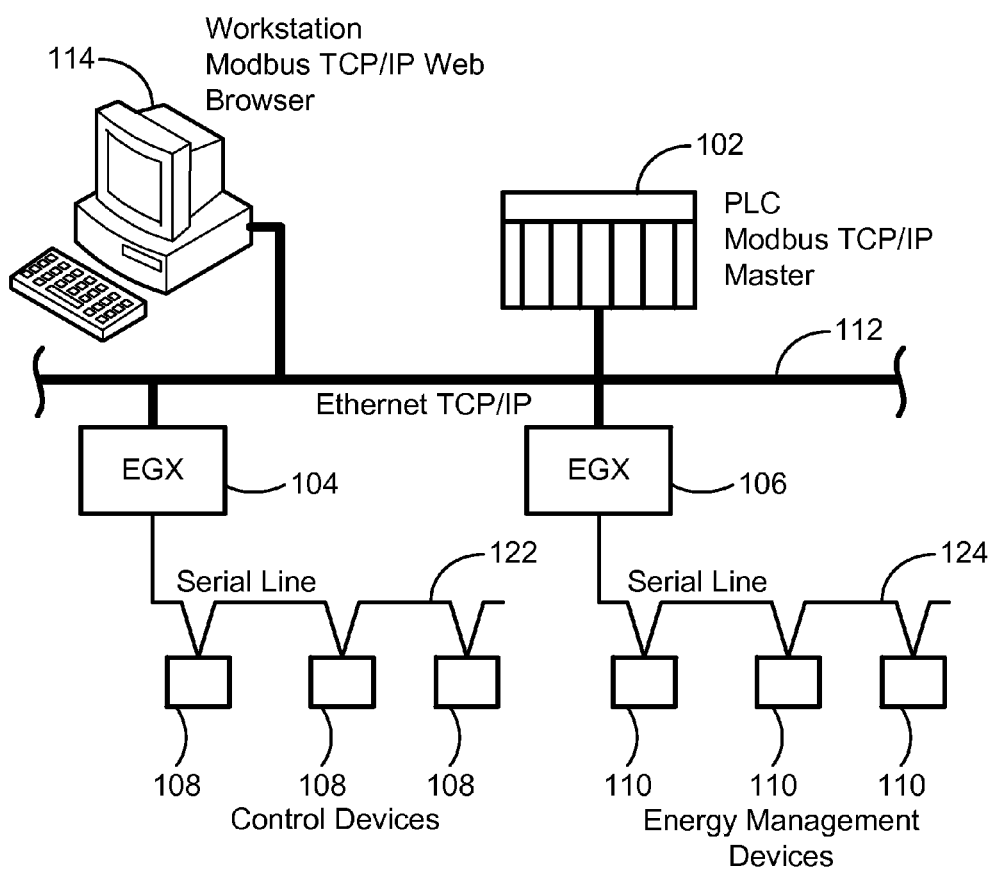
FIG. 1 is a diagram of a power monitoring system having monitoring devices that generate categories of data in time-value pairs for storage in a database.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 shows a utility data monitoring and control system 100 that includes a master controller 102 coupled to a gateway device 104 and a gateway device 106. As will be explained the utility data monitoring and control system 100 generates data based on monitoring various devices in a system and allows the control of various devices. In this example, the gateway device 104 is coupled to slave control devices 108 such as transformer temperature controllers, relays or trip units for controlling electrical equipment. In this example, the gateway device 106 is coupled to slave energy-management devices 110 such as power meters and circuit monitors. Alternatively, a programmable logic controller (PLC) may be used as a control slave device or an energy-management slave device. The slave devices 108 and 110 are each capable of Modbus communication. Generally, the slave devices 108, 110 may be controller- or microprocessor-based intelligent electronic devices (IEDs). Each of the slave devices 108 and 110 has an identification address according to the Modbus serial communications protocol, a well known standard protocol in the industrial automation, monitoring, and control systems. It is to be understood that fewer or additional slave devices may be used with the system 100. Further, the master controller 102 may control additional gateway devices that in turn communicate with additional slave devices via a serial line. Further, additional master controllers like the master controller 102 may be coupled to the network 112 to provide separate monitoring and control functions. The master controller 102 and the gateway devices 104 and 106 are coupled to a network 112. The master controller 102 in this example is a dedicated programmable logic controller that transmits and receives Modbus communications from the network 112 via a TCP/IP interface. Examples of a suitable Modbus TCP/IP master controller 102 are the Vision2x0 controller available from Unitronics based in Israel and the Modicon Quantum and the Modicon Momentum available from Schneider Electric.

A computer or workstation 114 is also coupled to the network 112. In this example, the network 112 is an Ethernet-based network or some other form of private local-area network (LAN). The private LAN is typically coupled to a wide-area network (WAN) such as the Internet that can include additional network nodes such as computers or workstations operating web browsers. In this example, the communications on the network 112 between the master controller 102, gateway devices 104 and 106, and the workstation 114 are standard TCP/IP communications.

The utility being monitored by the utility data monitoring system 100 can be any of the five utilities designated by the acronym, WAGES, or water, air, gas, electricity, or steam in this example. Each monitoring device represented by the devices 110 measures characteristics of a utility device or devices, and quantifies these characteristics into data categories that can be further analyzed by software. In this example, the data is output by the devices 110 in a format according to the Modbus protocol. For example, the devices 110 may measure categories of data in time-value pairs such as power, energy, volume per minute, volume, temperature, pressure, flow rate, or other characteristics of water, air, gas, electricity, or steam utilities and then output data relating to such measurements and the related time of the measurements. In the electrical context, the devices 110 may be a PowerLogic® Series 3000/4000 Circuit Monitor or a PowerLogic® ION7550/7650 Power and Energy Meter available from Schneider Electric or any other suitable monitoring device such as an intelligent electronic device (IED), a metering device, or a power meter. The devices 110 are capable of communicating according to the Modbus serial communications protocol over serial line 124 to the respective gateway device 106.

In the above example, the categories of data measured or monitored by the slave devices 110 from devices in the system, such as electrical devices, are output as a time-value pair in Modbus format by the slave devices 110. On receiving a read request from the master controller 102, the summoned slave device 110 sends its measured data over the serial line 124 to the gateway device 106, which sends it over the network 112 to the master controller 102. Alternatively, control signals or data from the master controller 102 may be written or sent to the slave devices 108 and 110 via the respective gateway devices 104 and 106. The computer 114 communicates with the controller 102 and may include a memory with a database to store the categories of time-value data pairs which are collected by the devices 110. The computer 114 may include applications such as software that analyzes the data or monitoring software.

Figure 2:
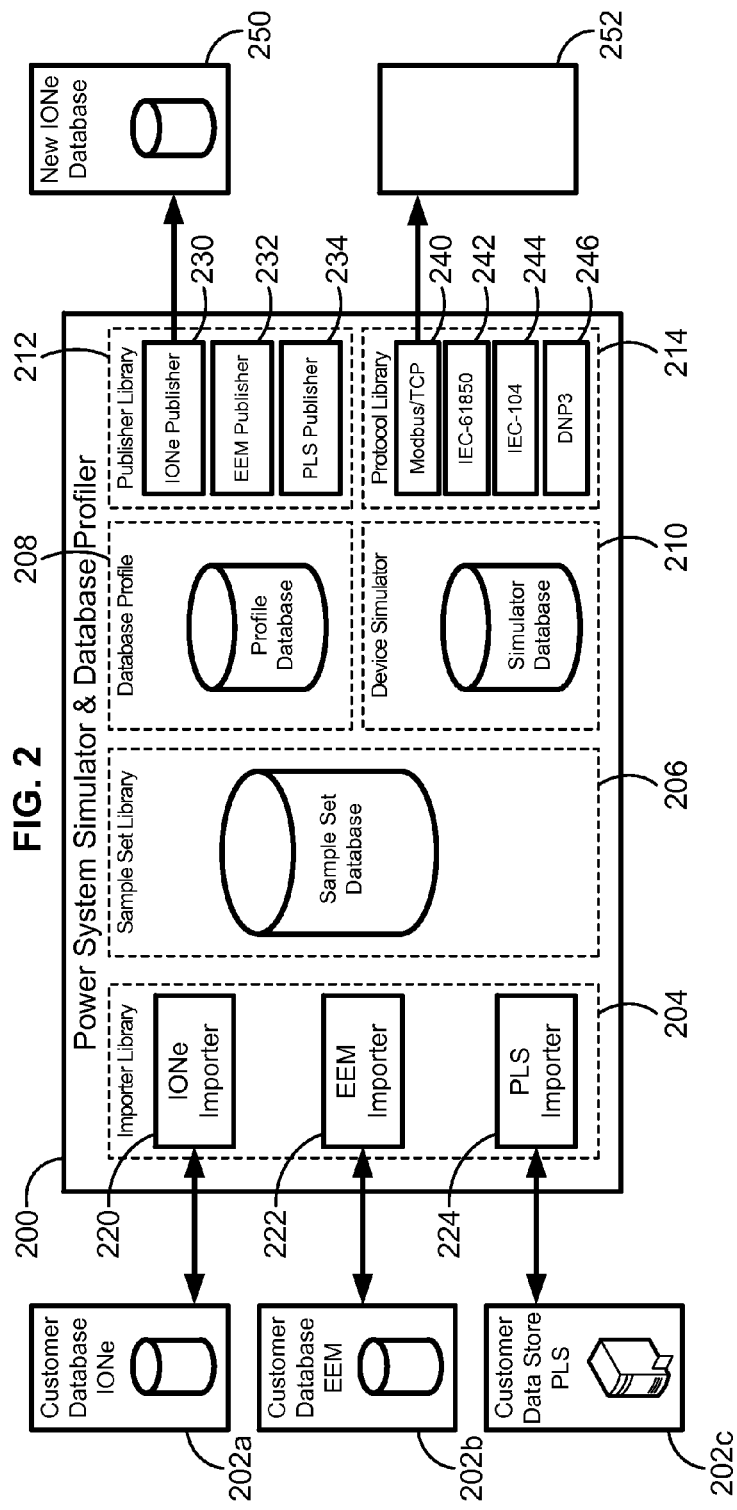
FIG. 2 is a block diagram of a profiling and database system for generating a test database for testing the monitoring software from data accumulated from an external database such as that in FIG. 1.

FIG. 2 shows a simulation data system 200 for generating a test database for database profiling of a power system simulation that may be accessed by applications such as testing monitoring software. The system 200 provides database profiles simulated data representing that of a system such as an electrical power system. The database profiles are based on a plurality of categories of time-value data stored in external databases that are preferably collected from devices in real world utility systems such as the monitoring system 100 in FIG. 1. The system 200 includes a series of external customer databases 202a-c, an importer library 204, a sample set library 206, a database profiler 208, a device simulator 210, a publisher library 212 and a protocol library 214. The external customer databases 202a-c may include the database managed by the computer 114 from FIG. 1, as well as other databases. In this example the databases 202a, 202b and 202c use different database languages specialized for energy system data such as IONe (Ion Enterprise), EEM (Enterprise Energy Enterprise), and PLS (PowerLogic SCADA). The importer library 204 includes a number of importer modules such as an IONe importer 220, an EEM importer 222, and a PLS importer 224. Of course other types of data importers may be used for the different types of data formats used by an external database such as any of the databases 202*a-c* or CSV, XML, etc. The sample set library 206 includes a sample set database that stores data based on the devices from the external databases 202*a-c* in a common data format. The publisher library 212 includes a number of publishers corresponding to different data formats for converting a specific data format to the common data format for use in the sample set library 206. In this example, the publishers in the publisher library 212 include an IONe publisher 230, an EEM publisher 232, and a PLS publisher 234. The publishers 230, 232, 234 publish the created test database profiles to a specific database format for application such as system simulation or testing monitoring software in an external device.

As the simulation data system 200 does not rely on randomly or heuristically generated data to assemble a database profile, an external database containing data collected from an existing electrical system is required. Of course the simulation data system 200 may use traditional methods of randomly generating a device data for the database profile for simulation and testing purposes. The importers 220, 222 and 224 in the importer library 220 are each unique to the format of a specific external database platform. In this example, an importer is written for each external database platform for which it is desired to acquire time-value pair data from. The importers 220, 222 and 224 perform the functions of interfacing with the external database, reading the historical (logged time-value pair data) in the external databases 202*a-c* respectively and converting the categories of time-value pair data from the external database to conform to topics in a common data model. The importers 220, 222 and 224 also convert time stamped data to conform to UTC ticks and the value data to the appropriate units in the common data model. Importers for the importer library 204 may be written for any external database system format that maintains categories of time-value pair information (including building management systems, infrastructure systems, automation systems, etc.). The sample set library 206 is designed to persist sample set data for future database profiling operations, publishing and device simulations. As will be explained, the data may be manipulated to create device profiles that are stored in the library 206.

The database profiler 208 designs a database of device profiles using the common model topics converted from the categories of data from the external database. The device profiles are then available to be included in a database profile suitable for use as test data. The data in such a database profile may be used for testing software applications such as monitoring software. The user includes selected parameters such as the number of devices, their device names, topic selection and other elements for suitable testing and profiling of an electrical system in a created database profile. A set of device templates are provided for rapid creation of the database device profile entries. This involves selecting the topics (measured parameters) the device contains, as well as the sample set data that will be used to populate that topic. Device profiles may be created for various devices that may be used in different systems. For instance, one device profile may be provided for a branch feeder meter and another device profile for a main feeder meter. Thus, device profiles are global and may be used for the corresponding device in any database profile. This process must only be completed once per device profile and therefore many database profiles may be created to include the same device profile or profiles.

Figure 3:
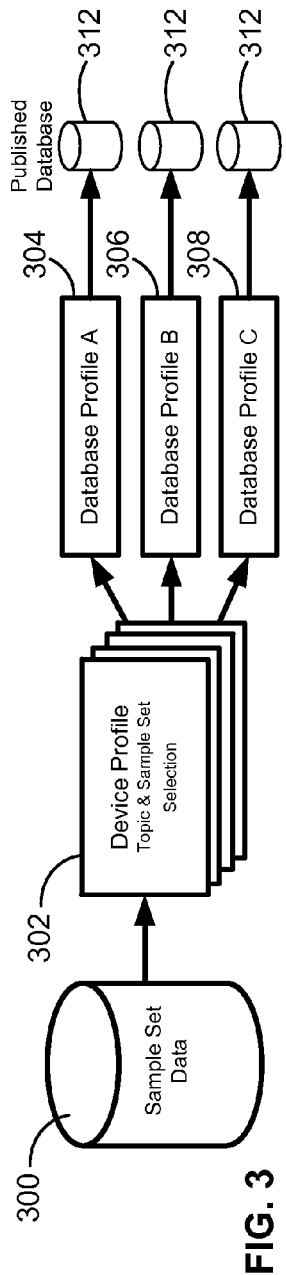
FIG. 3 is a block diagram of generic device profiles which are used by multiple database profiles created by the system in FIG. 2.

FIG. 3 shows a block diagram of the data files which are used by the system 200 to assemble database profiles. FIG. 3 includes a sample data set 300 which is derived from the external databases such as the databases 202*a-c* in FIG. 2. The sample set of data is parsed to provide a number of device profiles 302 which are created by selecting the common data format topics that are converted from the categories of data in the data set 300. Each of the device profiles 302 represents a device type that may be present in a variety of systems. As explained above, the device profiles 302 may be used in any number of database profiles 306, 308 or 310 or other database profiles which represent data from an overall system. The database profiles are then employed to test software by representing real system data via a set of published databases 312 that are produced by the system 200 using the publisher library 212 in FIG. 2. Alternatively, the database profiles may be used for these purposes by feeding the data directly to a monitoring system for testing.

Figure 4:
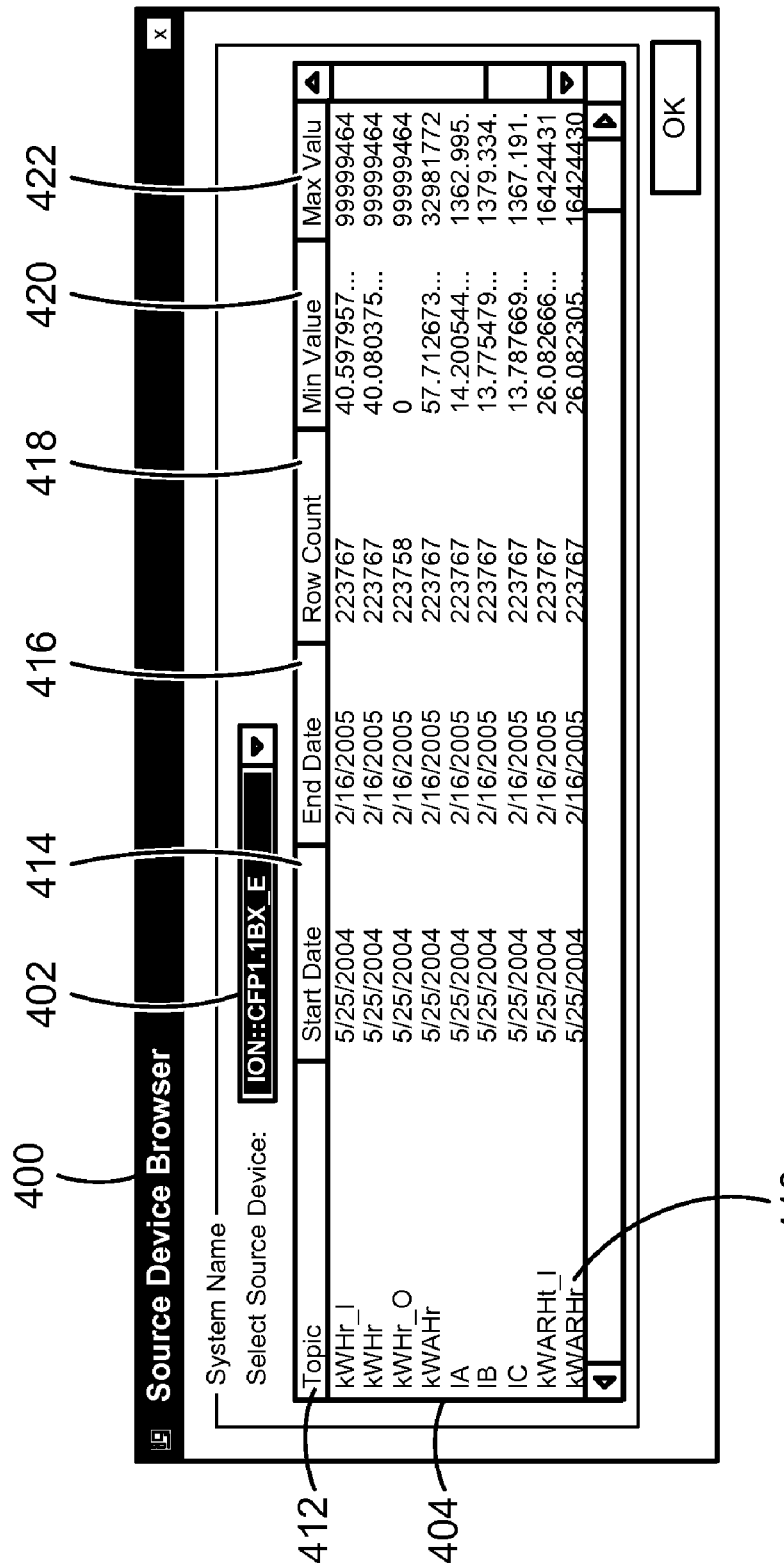
FIG. 4 is a screen view of an interface of the system of FIG. 2 for selecting data from an external database.

FIG. 4 is a screen view of an interface 400 that presents the time-value data of an external device database such as the database 202*a* in FIG. 2 to a user of the system 200. In this example, the time-value data in the external database 202*a* is in an IONe format and includes files of time-value data pairs. The interface 400 includes a source device pull down menu 402 and a table of data 404. The data is divided by columns 410 with the topics of data converted from the categories of time-value data available from the external database. The importer library 204 includes topics that are generic in the common data model. The importer such as the importer 220 converts the data from the external database format to the various topics defined by the common data model.

The columns 410 include a topic column 412, a start date column 414, an end date column 416, a row count column 418, a minimum value column 420 and a maximum value column 422. Each topic of data for a selected source device from the pull down menu 402 therefore lists the start date and end date of the data, the number of rows of data of that type and the minimum and maximum values of the data in the respective columns 414, 416, 418, 420 and 422.

Figure 5:
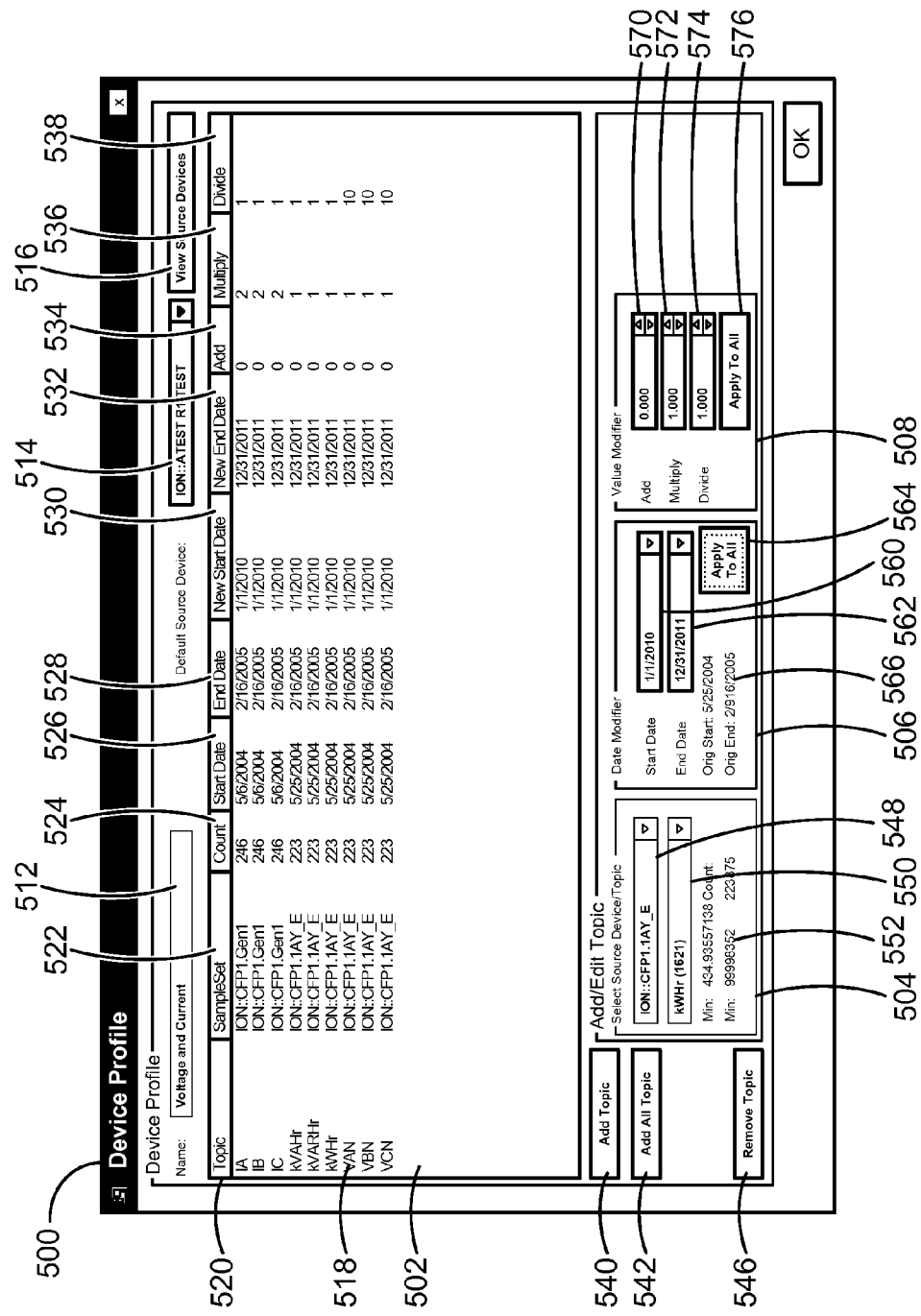
FIG. 5 is a screen view of an interface of the system of FIG. 2 for creating a device profile based on the selected data.

Using this information a device profile may be created from the available data topics and customized to fit a particular need. In addition to selecting the sample set data for a topic, it is also possible to time shift the data in the topic and manipulate the data based on an arithmetic operation such as mathematical offsets, multipliers and dividers, for the device profile. FIG. 5 is a screen view of an interface 500 for a conversion process and corresponding conversion modifiers used by the sample set library 206 in FIG. 2 to manipulate the sample set data to create a device profile.

The interface 500 includes a data area 502, an add/edit topic area 504, a date modifier area 506, and a value modifier area 508. The data area 502 includes the current data topics for a created device profile. A name field 512 displays the name of the created device profile. A default source device pull down menu 514 lists the source devices that the data topics were extracted from for the selected topic. A view source devices button 516 displays the available source devices from the external database when selected.

The data area 502 lists the data topics in lines 518 that were selected from the interface 400 in FIG. 4. The data area 502 includes data information for the data topics 518. This information is organized in a topic column 520, a sample set column 522, a count column 524, a start date column 526, an end date column 528, a new start date column 530, a new end date column 532, an add column 534, a multiply column 536 and a divide column 538. The topic column 522, the count column 524, the start date column 526 and the end date column 528 include the information relating to data for the particular topic taken from the external database. The information in the other columns 530, 532, 536 and 538 are determined by the user to modify the original data for the created device profile.

The add/edit topic area 504 includes an add topic button 540, an add all topics button 542 and a remove topic button 544. The topic area 504 includes a topic pull down menu 546, a source device pull down menu 548 and a topics pull down menu 550. An information field 552 includes the minimum and maximum values of the data set for the topic of selected by the pull down menu 550 and the number of data points for the topic (count). The source device pull down menu 548 allows a user to select a source device from the converted data originating from the external database. The topics pull down menu 550 allows a user to select a topic associated with the selected source device. The buttons 540, 542 and 546 allow the user to designate topics from the pull down menu 546. The add topic button 540 allows the user to add a topic to the lines 518 of the data area 502. The add all topics button 542 allows a user to add all of the topics that are converted from the external database. The remove topic button 546 allows a user to remove a topic displayed in the data area 502. In order to create a device profile, a user may therefore combine topics from different device sources from an external database and select which topics (and associated data) are included in the device profile.

The date modifier area 506 includes a start date pull down menu 560, an end date pull down menu 562 and a data field 566 which lists the original start and end dates of the topic taken from the external database. An apply to all button 564 allows a user to apply the selected start and end dates from the pulldown menus 560 and 562 to all of the selected topics in the data area 502. The data modifier area 506 allows a user to convert the original start and end dates of the imported data to new start and end dates for the simulation. The modified start and end dates are displayed in the display area 502. The date modifier area 506 thus allows a user to change the dates of the data from an external source device to create the new dates for device profile. The data is replicated for other parts of the date range that do not correspond directly with the original date range.

The value modifier area 508 includes an add control 570, a multiply control 572 and a divide control 574. Each of the controls 570, 572, and 574 allow a user to enter numbers for modifying the original data values mathematically according to the specific control 570, 572 or 574. For example, the add control 570 allows a user to enter a number to be added to the data values in a topic. Similarly, the multiply control 572 allows a user to enter a number for multiplying the data values in a topic. The modified values are shown in columns 534, 536 and 538. If a user wishes to modify all of the topics, a modify all button 576 is provided.

In FIG. 5, a device profile (named "Voltages and Current") as shown in the name field 512 is being created from a sample data set created from an external IONe database such as the external database 202a. The source name ("CFP1.Gen1") is listed for each data value in this set as shown in the sample set column 522 entry for the data lines 518. As shown in FIG. 5, the device profile is created using the three topics, current values (IA, IB, IC), shown in the topic column 520 from one source device. As shown in FIG. 5, other topics may be added from other source devices to create the device profile. The original data for the IA, IB and IC topics in this example was logged in a time period from May 6, 2004-Feb. 16, 2005 as shown in the start date and end date columns 526 and 528. In this example, a user may want the logged data to be representative of data collected from the time period Jan. 1, 2010-Dec. 31, 2011. The shifted date is selected via the controls in the date modifier field 506 and displayed in the columns 530 and 532. As this is a longer time span (2 years requested with a sample set of under a year), the system 200 will automatically time shift and repeat the sample set data when publishing a database for the other dates in the range. In addition to time shifting, data values in the topics may also be manipulated by use of the multiply control 572 and the divide control 574 which shows that the currents are multiplied by 2 and the voltages are divided by 10. During the publishing process these manipulations will be performed on the data to be published in the database. By providing data manipulations, a user may publish a database that simulates very complex one-line diagrams including multiple voltage levels (using multipliers to compensate for transformers) and loads (using offsets to compensate for loads). Once a device profile has been configured, it is saved in the sample set library 206 and can then be used in any created database profile.

Figure 6:
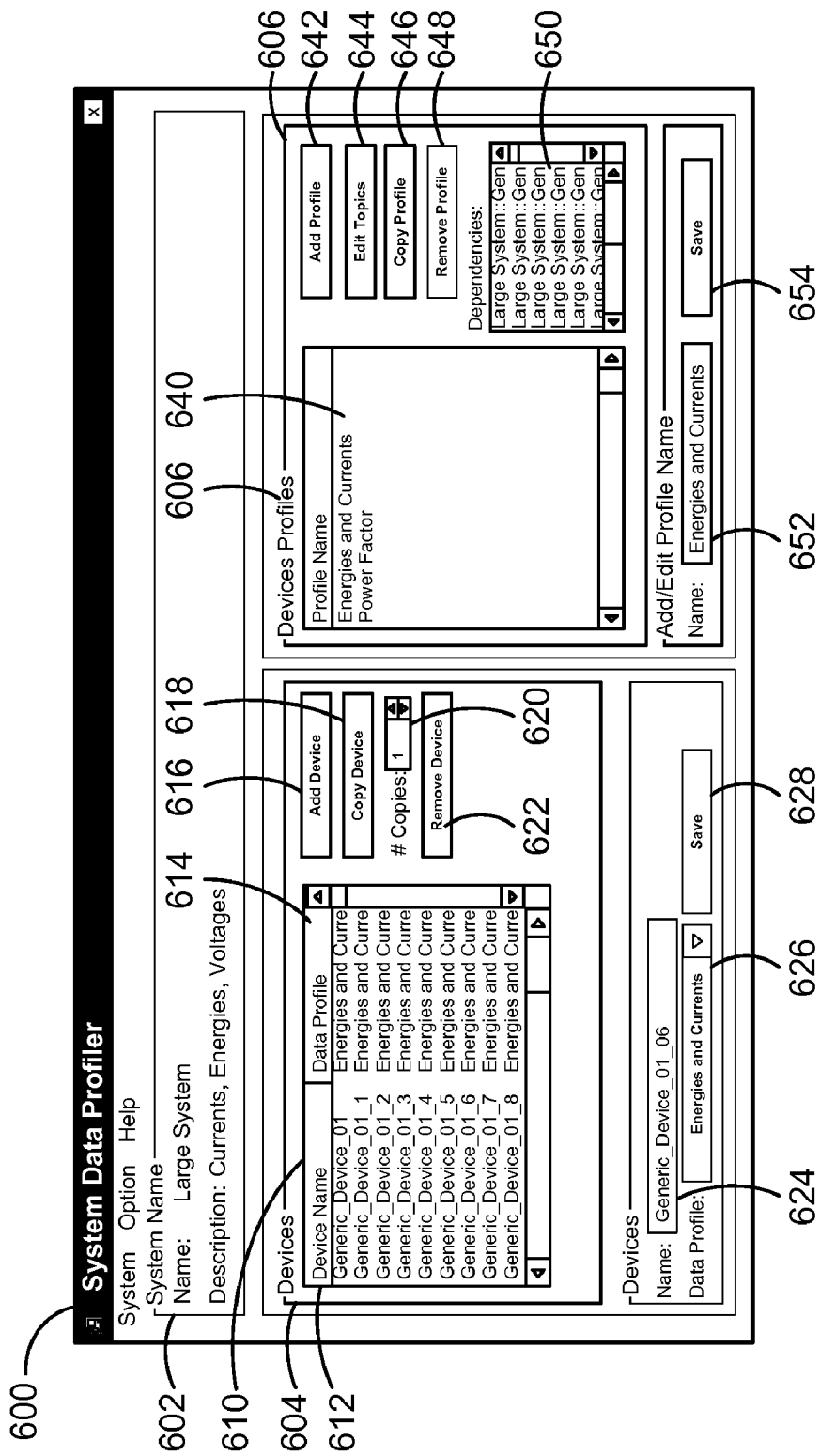
FIG. 6 is a screen view of an interface of the system of FIG. 2 for creating a database profile.

FIG. 6 shows an interface 600 that allows the creation of a database profile by the database profiler 208 in FIG. 2. The creation of a database profile simulated data from a system includes creating devices in such a system from the globally available device profiles as shown in FIG. 3. The device profiles are created using the interfaces 400 and 500 in FIGS. 4-5. The interface 600 in FIG. 6 includes a system information field 602, a devices area 604, and a device profile area 606. The system information field 602 includes the name of the created database profile and a description of the topics of interest in the database profile. The devices area 604 includes a device data window 610 that includes a device name column 612 and a data profile column 614. The devices area 604 includes an add device button 616, a copy device button 618, a number of copies field 620 and a remove device button 622. The devices may be added via a name field 624, a device profile pull down menu 626 and a save button 628.

The device profiles area 606 includes a device profiles window 640 that includes a listing of the device profiles in the sample set library 206. The device profiles area 606 includes an add profile button 642, an edit topics button 644, a copy profile button 646 and a remove profiles button 648. The device profiles area 606 includes a dependencies window 650 and a name entry field 652 and a save button 654. The remove profiles button 648 allows the user to remove selected topics from the database display interface 400 in FIG. 4. The name field 650 and a save button 652 allow a user to add and edit the names of device profiles to be included in the device profiles window 640.

In order to create a database profile, a user will designate the name and description of the database profile which will be displayed in the system information field 602. The user may use the device profiles area 606 to select different stored device profiles and their associated data which may be available for the database profiles. The user uses the controls in the device area 604 to create various devices which are associated with an available device profile from the device profiles area 606. Once a single device is created, the device and associated device profiles may be replicated for many devices.

In the example in FIG. 6, a database profile for a system (named "Large System") as shown in the system information field 602, has been created and many devices (all of which are associated with the "Energies & Currents" device profile) have been added as shown in the device data window 610. Adding devices to a database profile is therefore very simple and semi-automated via the interface 600. A user clicks the add device button 616, enters a name for the device in the name field 624 (e.g., "Generic_Device_01"), selects a device profile using the pulldown menu 626 and clicks the save button 628. That device and associated device profile may automatically be copied any number of times via the number of copies field 620 and the copy button 618. In this example, the device profile for "Generic_Device_01" has been replicated for identical devices which have been named "Generic_Device_01_1," "Generic_Device_01_2," etc. The interface 600 allows a user to configure a database profile for a very large system in a very short time (provided a library of device profiles has been created and is available to the system 200).

Returning to FIG. 2, once created, the database profile may then be used to publish platform-compatible data sets in databases (such as IONe databases or PowerLogic SCADA trend files) via a publisher in the publisher library 212. The created database profile may thus be published using one of the publishers 230, 232, or 234 in the publisher library 212 in FIG. 2 to an external database in a destination platform 250. Similar to the importers 220, 222 and 224, each publisher 230, 232 and 234 is designed to work with its corresponding destination platform such as the external database 250 which is in an IONe format. The system 200 thus converts the abstracted data (from the sample set library 206) contained in the database profiler to a format that conforms with the destination platform's data model. This includes converting any topic and device identifiers to the platform model and adjusting any timestamps to those required by the device profile's time period for a database profile.

The device simulator 210 may use the completed database profiles to project sample set data as if it were currently being acquired by a monitoring system from monitored devices such as the devices monitored by the system 100 in FIG. 1. This allows data acquisition systems to actually acquire the data used in such database profiles, allowing for load based testing and modeling at the very lowest level since the data is based on real world devices. Such data is converted via protocol converters in the protocol library 214 which allows an external system 252 to read the data from the database profiler in a native format and is substituted for actual data from monitoring devices for testing purposes. Such protocol converters may include a MODBUS/TCP converter 240, IED-61850 converter 242, IED-104 converter 244, and a DNP3 protocol converter 246. For example, a user may desire to test an external monitoring system 252 that operates by monitoring data received in a MODBUS protocol. The database profile is therefore converted for transmission to the external monitoring system 252 for testing via a MODBUS communications protocol such that the system 252 receives data in the protocol directly from the simulation system 200 and operates based on that data.

The simulator system 200 may be used for a number of applications including performance testing large systems, functional testing, sales demonstrations, deployment/commissioning and post deployment. The system 200 may be used for performance testing large systems which allows a testing environment (test lab) to conduct performance testing of such systems on large databases. This is especially important for load-based and speed-based testing. These large databases must be created and persisted for many years (for technical support and validation of the speed claims). Database profiling by the system 200 allows for these databases to be used and discarded (as an identical database can be re-created in minutes using the configuration from the database profile). A test lab will generally import a number of customer databases and create a large library of device profiles. When a specific database configuration is needed, a database profile is created using the system 200 with device profiles from the library 206 and published. When the database profile is no longer needed, it can be discarded (as it can be re-created at any future time).

Functional testing allows the testing of calculation engines (and other business logic) as well as the user interface. As the data that has been inserted into the database is known as well as the relationship between the devices (via data manipulation), it is much easier to verify results for accuracy. For sales demonstrations, a salesperson may create a customized database using the system 200 for a particular customer using the correct quantity of devices and the requested topics based on the customer's own databases. If migrating from a legacy system, the salesperson (using the customer's existing database) may migrate the data and use it in a sales demonstration. This method can also be used during the commissioning process for migrations as explained below.

Another use for the database profiles may be a training course held for the use and configuration of power monitoring systems. Training courses generally use a fresh installation of monitoring or application software with little to no data. This is mainly due to the space required to persist (or the time required to generate) logged data for the students. The system 200 may be used to generate database profiles for software testing. Such generated database profiles may be deleted after use and recreated on demand. The system 200 may also be used for device simulation such as real-time alarms.

The deployment and commissioning cases include migration scenarios, testing solutions during commissioning, reviewing what if scenarios, customer training and validation. For migration scenarios, a system integrator may import a legacy database via an appropriate importer, modify it as needed using the system 200 and publish it to the new platform. For testing solutions during commissioning a power plant for example, the available physical device data is required to stress test a system. The amount of historical logged data is very small and is not representative of the system's behavior after a period of time (e.g., a year). The profiling and simulation functions of the system 200 address these issues. Database profiling allows the system integrator to create a database using the device count and topics of the solution to stress the software. Simulation (using programmable delays) can assist in verifying custom calculations and HMI solutions.

Many times in commissioning a question is asked by a customer such as "what if this happens?" "what happens if the generator fails?" or "what happens if all HVAC systems come on at the same time?" Database profiling and device simulation based on the system 200 allows modeling these scenarios for commissioning systems.

Another commissioning use may be customer training in which the system integrator trains the end user on the specific solution in an actual system. This is commonly done before the facility is completely operational. Using the system 200 to generate a database profile allows training to be performed with the database profile without much impact to the actual system. Device simulation allows the integrator to temporarily show the end user simulated device information even if the software does not have a simulation mode or capability. Database profiling by the system 200 may also assist in report and custom report generation.

The validation step of commissioning involves the verification that the data acquired by the software is in fact the data acquired by a given device (as well as the correct units, etc). When an error is found in validation, a determination must be made whether the error is with the device or software configuration. Simulation using the database profiles from the system 200 can potentially eliminate this issue as it allows integrators to validate the software completely independent of the physical devices (or their installation/configuration status). When it is time to do a full validation (hardware and software), the software will have far fewer configuration errors because of the use of the software on the database profiles generated by the system 200.

There are a number of uses of the system 200 in post deployment situations. The device simulation of the system 200 allows an end user to create what-if scenarios (or perform modeling) to assist them in decisions or provide suggestions. In this use case the user creates device profiles to represent their future plans (expansion of building, removal of generator, etc) and allows the software to react to the simulation. Database profiling (using data manipulation) by the system 200 may assist modeling engines in the generation of accurate models since the customer's historical data with manipulations applied is used by the system 200.

Technical support or continuous engineering personnel may use the system 200 to create test environments in order to replicate a problem occurring at a customer's site. Many of the problems presented involve very large or complex systems that stress the system or involve numerous edge cases. Recreating these environments are non-trivial problems but the profiler and simulator of the system 200 may assist users that require such support by providing data for such replication of problems.

Figure 7:
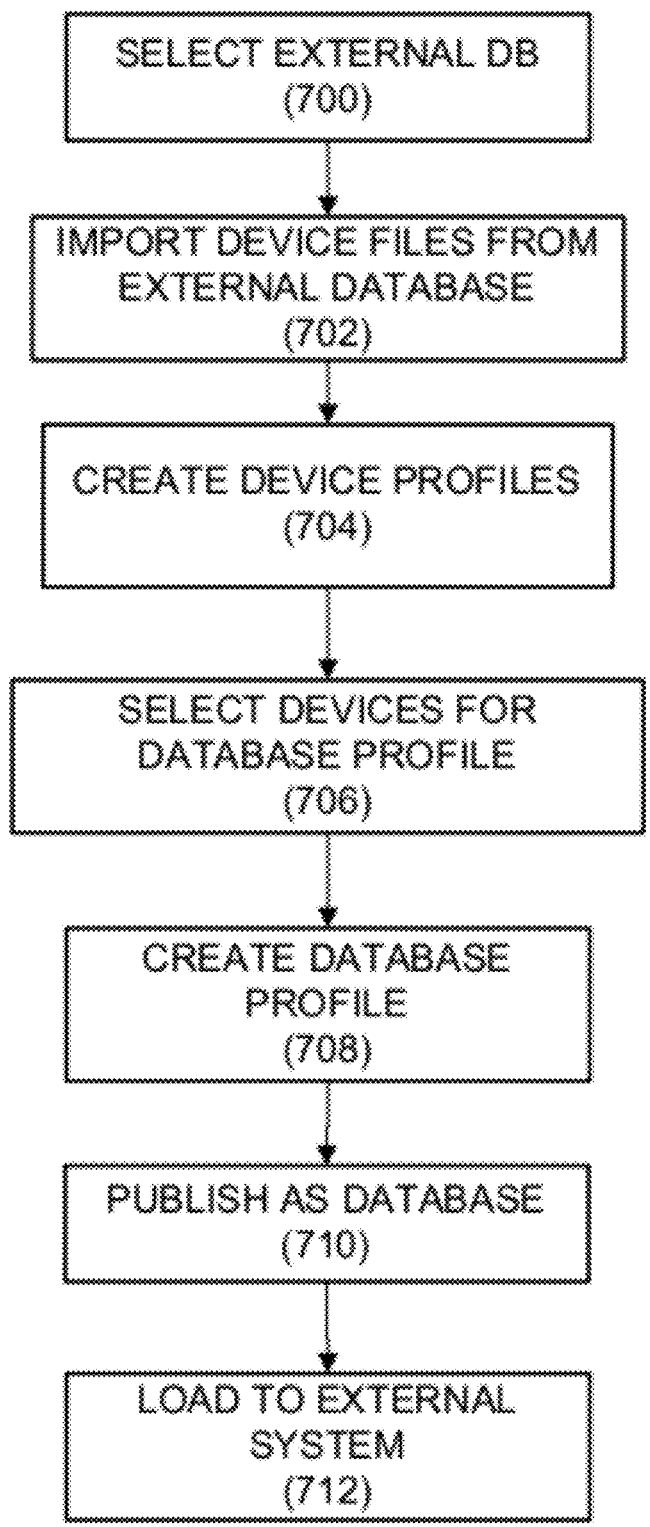
FIG. 7 is a flow diagram of the creation of a test database for the profiling process using an external database.

Any of these algorithms include machine readable instructions for execution by: (a) a processor, (b) a controller, and/or (c) any other suitable processing device. It will be readily understood that the system 200 includes such a suitable processing device. Any algorithm disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in a flowchart in FIG. 7 depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 7 shows a process of producing a database profile of a system of devices suitable for testing application software using the system 200 in FIG. 2. An external database including categories of time-value data collected from electrical devices such as the external database 202*a* is selected (700). The device files in the external database 202*a* are imported by an importer from the importer library 204 (702). The importer converts the categories of data into different generic topics defined by a common data format. A set of device profiles is created based on the converted categories of data in the common data format (704). The set of device profiles is then incorporated into devices selected for a database profile (706). The database profile is created based on selected devices and topics associated with the devices (708). The completed databases may either be published for an external platform (710) or they may be loaded into a device simulator for transmission to a system that requires testing data (712).

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A input test data generation system to generate a test database to provide input test data to test a utility monitoring system, the input test data generation system comprising:
 an external database interface to access an external database, the external database including a plurality of categories of time-value data collected from an electrical device in an existing utility system;
 an importer for converting one of a plurality of categories of time-value data to a corresponding topic of a common data format;
 a device profiler coupled to the importer to create a test device profile including the converted topic; and
 a database profiler to create a test database profile representing a utility system output including a device defined by the device profile and including the category of time-value output data to provide input test data to test the utility monitoring system.

2. The system of claim 1 further comprising a publisher coupled to the database profiler to publish the database profile to an external output database.

3. The system of claim 1 further comprising a communications interface coupled to the database profiler, the communications interface sending the database profile to a monitoring system to simulate generation of actual data to the monitoring system.

4. The system of claim 1, wherein the importer allows modification of the time-value data by changing the times in the category of data to new times.

5. The system of claim 1, wherein the importer allows modification of the category of time-value data via an arithmetic operation.

6. The system of claim 5, wherein the arithmetic operation includes adding a value to the data, dividing the data or multiplying the data.

7. The system of claim 1, wherein the device profile is used to create a second database profile of a second system.

8. The system of claim 1, wherein the device profile is replicated for multiple devices in the database profile.

9. The system of claim 1, wherein the common data format has a plurality of topics, the plurality of topics matching at least some of the plurality of categories of time-value data, and the importer allowing the selection of any of the plurality of topics for conversion matching the plurality of external database time-value pairs, wherein the device profile includes more than one of the plurality of topics.

10. The system of claim 1, further comprising a device profile library including a plurality of device profiles, wherein the created device profile is stored in the device profile library, and the database profile includes a plurality of different devices each defined by one of the plurality of device profiles.

11. A method for generating a test database to provide input test data to test a utility monitoring system, the method comprising:
 accessing an external database including a plurality of categories of time-value data collected from an electrical device in an existing utility system via an interface;

converting one of plurality of categories of time-value data to a corresponding topic of a common data format;
creating a device profile including the converted topic; and
creating a test database profile representing a utility system output including a device defined by the device profile and including the category of time-value data to provide input test data to test a utility monitoring system.

12. The method of claim 11 further comprising publishing the database profile to an external output database.

13. The method of claim 11 further comprising sending the database profile to a monitoring system in a communications protocol to simulate generation of actual data to the monitoring system.

14. The method of claim 11, wherein the converting allows modification of the time-value data by changing the times in the category of data to new times.

15. The method of claim 11, wherein the converting allows modification of the category of time-value data via an arithmetic operation.

16. The method of claim 15, wherein the arithmetic operation includes adding a value to the data, dividing the data or multiplying the data.

17. The method of claim 11, wherein the device profile is used to create a second database profile of a second system.

18. The method of claim 11, wherein the device profile is replicated for multiple devices in the database profile.

19. The method of claim 11, wherein the common data format has a plurality of topics, the plurality of topics matching at least some of the plurality of categories of time-value data, and the importer allowing the selection of any of the plurality of topics for conversion matching the plurality of external database time-value pairs, wherein the device profile includes more than one of the plurality of topics.

20. A machine readable medium having stored thereon instructions for generating a test database to provide input test data to test a utility monitoring system, the test database generated from an external database of time-value entries collected from an electrical device in an existing utility system, the stored instructions comprising machine executable code, which when executed by at least one machine processor, causes the machine to:
   access an external database including a plurality of categories of time-value data collected from an electrical device in the utility system via an interface;
   convert one of plurality of categories of time-value data to a corresponding topic of a common data format;
   create a test device profile including the converted topic; and
   create a database profile representing a utility system output including a device defined by the device profile and including the category of time-value data to provide input test data to test a utility monitoring system.

* * * * *